H. W. WHITING.

Assignor of two-thirds to A. E. PETERSON and J. H. C. WHITING.

APPARATUS FOR BURNING HYDROCARBON OILS.

No. 10,699. Reissued Mar. 9, 1886.

WITNESSES:

Charles F. Ziegler

J. H. C. Whiting

INVENTOR

Henry W. Whiting

N. PETERS, Photo-Lithographer, Washington, D. C.

UNITED STATES PATENT OFFICE.

HENRY W. WHITING, OF PHILADELPHIA, PA., ASSIGNOR OF TWO-THIRDS TO ALBERT E. PETERSON AND JOHN H. C. WHITING, OF SAME PLACE.

APPARATUS FOR BURNING HYDROCARBON OILS.

SPECIFICATION forming part of Reissued Letters Patent No. 10,699, dated March 9, 1886.

Original No. 306,887, dated October 21, 1884. Application for reissue filed May 26, 1885. Serial No 166,792.

*To all whom it may concern:*

Be it known that I, HENRY W. WHITING, of Philadelphia, in the State of Pennsylvania, have invented a new and useful Improvement in Apparatus for Burning Hydrocarbon Oils when Intensely Superheated in Combination with Steam.

The following is a specification of my said improvements, reference being had to the accompanying drawings, wherein—

Figure 1:
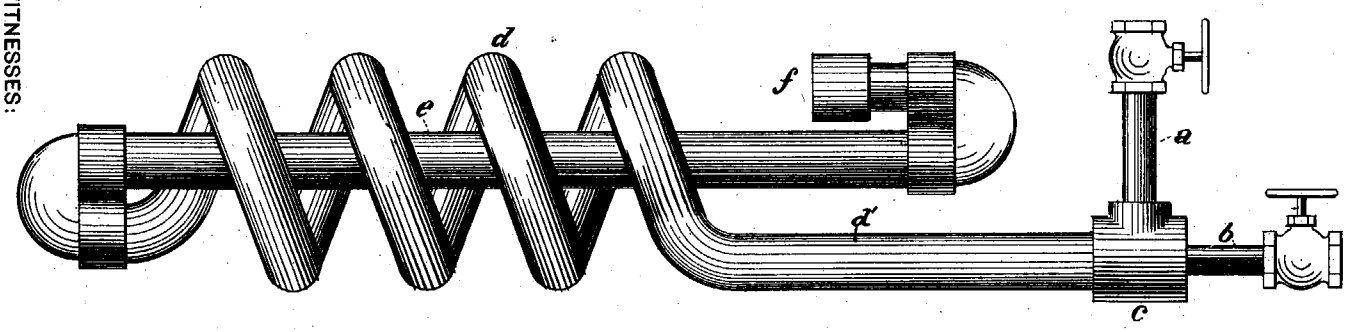
Figure 2:
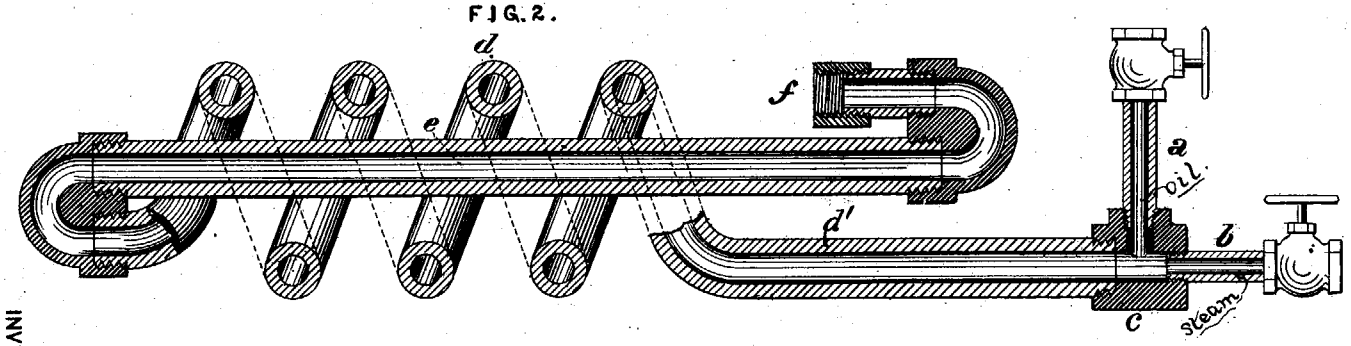

Figure 1 is an exterior side view, and Fig. 2 a longitudinal central section of an apparatus embodying my invention in a convenient form.

The burner is intended to generate, and at the same time consume near the point of generation, that gas or vapor which results from the combination of hydrocarbon oil and steam intensely superheated while mingled together, the operation being so conducted as not only to produce very high heats with economy of fuel, but to avoid all back-pressure in the apparatus, and to obviate the deposit of carbon or other residuum therein.

The invention consists of the following parts arranged in combination substantially in the manner herein described, viz: a supply-pipe for steam, a supply-pipe for oil or other hydrocarbon in the form of liquid or vapor, said pipes leading into a common superheater channel or pipe of substantially uniform bore throughout and of such length or tortuous form as that the steam and hydrocarbon shall be intensely superheated during their passage without arrestation, and a burner connected therewith, said burner being adapted to consume in practically a single blast all the gas or vapor generated in the superheater, and being so placed with relation thereto as to direct the blast of flame along the superheater. I thus effect by the action of the burner itself an intense superheating of the hydrocarbon while in combination with the steam, and obtain a burner which is adapted to consume a strong blast of mingled steam and oil and produce a high heat economically while keeping the passages free from carbon deposits.

In the accompanying drawings, *a* represents an upright pipe for supplying a stream of hydrocarbon, preferably oil. The horizontal pipe *b* supplies the steam, elsewhere generated. These pipes *a b* are conveniently connected with the superheater of the apparatus by means of a right-angle joint or coupling, *c*, into which they both lead, and wherein the oil and steam come into contact. From this coupling *c* a pipe, *d'*, leads to the superheater, which preferably consists of a coil, *d*, or other tortuous channel of substantially uniform bore throughout. From the end of this coil a return-pipe, *e*, passes (through the center of the coil) and communicates with a burner, *f*, which is again turned so as to play upon the coil *d* and the pipe *e*. The orifice area of the burner *f* should, in order to prevent back-pressure and accumulation, be made larger than the combined area of the opening through which oil and steam are supplied, and should be not less than the area of the superheater-bore.

The operation of the apparatus, of which the foregoing description is a convenient type, is as follows: Combustion is preferably first started by applying external heat from any source to the superheater of the apparatus. The vapor issuing from the burner *f* being ignited, plays upon and heats up the superheater *d' e*, and as soon as a sufficient temperature is reached the desired flow of oil through the pipe *a* and of steam through the pipe *b* is established. The mingled oil and steam are forced along into the superheater of the apparatus, where they are completely vaporized and superheated in combination, and are thence driven without arrestation through the pipe *e* to the burner *f*. The flame of the burner, when combustion is once fully established, plays with great force upon the whole length of the superheater and heats it very highly, so that in the rapid passage of the mingled hydrocarbon and steam they are superheated in combination and generate a vapor which produces an intense combustion.

I have described the above as the best form known to me for the practical embodiment of my invention, since piping is the cheapest and most convenient material from which to construct the several parts. I do not, however, limit myself to the use of "piping" as the term is ordinarily understood in commerce, since the channel or passage might be constructed out of separate pieces secured together, provided the conditions before referred to as to its area were observed, and provided its length were such as to obtain the exposure necessary for superheating the mingled vapors.

I am aware that prior to my invention hydrocarbon oils have been heated in coiled pipes and burned in conjunction with air also heated, and that coiled pipes have been used to generate steam for the purpose of taking up or spraying hydrocarbon oils; and I am also aware that in apparatus for generating a gas from steam and the vapor of oil the flame of the gas produced has been used to heat the oil and generate the steam in a boiler which forms part of the apparatus itself. Such apparatus are only adapted to produce a low degree of heat suitable for cooking-stoves, &c., and so far as I am aware none of them can generate a rapid flow of steam and intensely-heated blast, or if such blowing steam be elsewhere generated they are not adapted to consume it without producing back-pressure or clogging of the passages and subsequent waste.

I am also aware that a separate coil for superheating steam has been used in conjunction with an enlarged chamber or retort into which oil was admitted and mixed with said steam after the separate superheating of the latter, and that in such apparatus a series of jets fed from the apparatus itself has been used to heat the coil and retort. Such apparatus, however, does not superheat the steam while it is in combination with the oil or vapor, nor is it in any proper sense a superheater-burner, since it practically amounts to a large retort or generator adapted to produce much more gas than can be properly consumed by the burner in a single intense blast, which latter mode of operation is characteristic of my device. I therefore do not claim, broadly, either the idea of generating vapor by the combination of oil and steam or the heating of water and oil separately and their combination to form a combustible gas. In none of the devices referred to, however, does the apparatus combine in itself a burner which operates as its own superheater by projecting a practically single intense flame upon a superheater-chamber into which a rapid blast of steam and flow of oil are admitted. I therefore disclaim all such prior forms of generator, and

I claim—

1. A superheater-burner consisting of the following parts in combination, the respective areas of said parts being as follows, viz: a supply-pipe for hydrocarbon oil or vapor, a supply-pipe for steam, a common superheater-pipe into which the same leads and in which they are simultaneously superheated while in combination, the bore of said pipe being substantially uniform throughout, and a burner leading from said superheater and having an orifice area greater than the combined areas of the openings through which oil and steam are admitted and not less than the area of the superheater-bore, said burner being directed toward said superheater, whereby the vapors are driven through the apparatus without arrestation, and the total product is directed in a substantially single blast upon the superheater, in the manner and for the purposes set forth.

2. A superheater-burner formed of piping and consisting of the following parts in combination: the steam-pipe *b*, oil-pipe *a*, connected therewith, the superheater *d* in the form of a coil, and the return-pipe *e*, leading to the burner, which is so placed that the flame is discharged along the pipe *e* and upon the superheater-coils for the purpose of heating the mingled oil and steam on its passage to the burner, substantially as described.

HENRY W. WHITING.

Witnesses:
CHARLES F. ZIEGLER,
ALBERT E. PETERSON.